US007299655B2

(12) United States Patent
Ward

(10) Patent No.: US 7,299,655 B2
(45) Date of Patent: Nov. 27, 2007

(54) SYSTEMS AND METHODS FOR VAPORIZATION OF LIQUEFIED NATURAL GAS

(75) Inventor: Patrick B. Ward, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 316 days.

(21) Appl. No.: 11/006,941

(22) Filed: Dec. 8, 2004

(65) Prior Publication Data

US 2005/0126220 A1 Jun. 16, 2005

Related U.S. Application Data

(60) Provisional application No. 60/529,693, filed on Dec. 15, 2003.

(51) Int. Cl.
*F17C 5/02* (2006.01)
*F25J 1/00* (2006.01)
*C01B 3/32* (2006.01)
*C01B 3/24* (2006.01)
*B01J 8/00* (2006.01)

(52) U.S. Cl. ........................ 62/614; 62/47.1; 48/127.1; 48/127.3; 48/127.9

(58) Field of Classification Search .................. 62/614, 62/612, 50.2, 47.1, 48.2; 48/127.1, 127.3, 48/127.9
See application file for complete search history.

(56) References Cited

U.S. PATENT DOCUMENTS 3,407,052 A 10/1968 Huntress et al.
3,419,369 A * 12/1968 Kelley ....................... 48/127.1
3,527,585 A 9/1970 Ungerleider
3,837,821 A 9/1974 Buffiere et al. ............... 48/196

(Continued)

FOREIGN PATENT DOCUMENTS

CH 0525430 7/1972

(Continued)

OTHER PUBLICATIONS

Rogers, "Gas Interchangeability and its Effects on U.S. Import Plans", Pipeline & Gas Journal, Aug. 2003, pp. 19-28.

(Continued)

*Primary Examiner*—William C Doerrler
(74) *Attorney, Agent, or Firm*—John L. Wood

(57) ABSTRACT

Disclosed are methods and systems for vaporization of liquefied natural gas (LNG) that employ a condensing gas stream to adjust the gross heating value (GHV) of the LNG such that, upon vaporization, a natural gas product is obtained that meets pipeline or other commercial specifications. The condensing gas can be air, nitrogen, or in embodiments, NGLs such as ethane, propane, or butane, or other combustible hydrocarbon such as dimethyl ether (DME) depending on a desired change in GHV. In some embodiments, the methods and systems employ an integrated air separation plant for generation of nitrogen used as a condensing gas, wherein a cool stream of a heat transfer medium, such as water, ethylene glycol, other common heat transfer fluids, or mixtures thereof, obtained by heat transfer during vaporization of the LNG is used to pre-cool an air feed to the air separation plant, or to cool other process streams associated therewith.

80 Claims, 2 Drawing Sheets

U.S. PATENT DOCUMENTS

| | | | | |
|---|---|---|---|---|
| 5,590,535 | A * | 1/1997 | Rhoades | 62/50.2 |
| 6,449,983 | B2 | 9/2002 | Pozivil | |
| 6,470,706 | B1 * | 10/2002 | Engdahl | 62/614 |
| 6,564,579 | B1 | 5/2003 | McCartney | 62/620 |
| 6,745,576 | B1 | 6/2004 | Granger | |
| 2005/0204625 | A1 * | 9/2005 | Briscoe et al. | 48/127.3 |

FOREIGN PATENT DOCUMENTS

| | | |
|---|---|---|
| FR | 2765238 | * 12/1998 |
| GB | 1280342 | 7/1972 |

OTHER PUBLICATIONS

Rogers, "Long-Term Solution Needed To Embrace Imports With Pipeline Gas", Pipeline & Gas Journal, Sep. 2003, pp. 14-22.

Ward, Patrick B., U.S. Appl. No. 10/805,943, filed Mar. 22, 2004.

Lemmers et al., "A New Recondenser", LNG Journal, pp. 24-27, Jul./Aug. 1999.

* cited by examiner

SYSTEMS AND METHODS FOR VAPORIZATION OF LIQUEFIED NATURAL GAS

CROSS REFERENCE TO RELATED APPLICATIONS

This application claims benefit of U.S. Provisional Application Ser. No. 60/529,693, filed Dec. 15, 2003, the teachings of which are incorporated herein by reference in their entirety.

FIELD OF THE INVENTION

The present invention relates generally to the storage and distribution of liquefied natural gas (LNG) and vaporization of the LNG into a natural gas product. More particularly, the present invention relates to systems and methods to modify the gross heating value (GHV) of the LNG so as to produce, upon vaporization, a natural gas product that meets pipeline or commercial specifications, or is otherwise interchangeable with domestically produced natural gas.

BACKGROUND OF THE INVENTION

Presently, the use of imported LNG is becoming increasingly important for many countries as the demand for natural gas continues to increase, while domestic production, particularly in the United States and Canada, has been on decline. The imported LNG can make up for a shortfall in domestic production and/or otherwise meet market demand during peak periods, such as during the winter heating season. Such LNG is produced by any of a number of liquefaction methods known in the art, and typically is produced at and imported from a number of remote areas around the world having vast natural gas supply sources, such as the Middle East, West Africa, Trinidad, Australia, and Southeast Asia. After being shipped from such remote locations by specially designed cryogenic tankers, the LNG is typically stored at cryogenic temperatures, until just prior to use, at various locations around the world near locations of high natural gas demand.

It is known that LNG produced from such remote locations in many instances when vaporized does not meet pipeline or other commercial specifications. The resulting natural gas may have an unacceptably high heating value, typically referred to as gross heating value or "GHV". Various methods have been proposed or used to adjust the GHV of LNG to produce natural gas that will meet pipeline specifications, as is discussed by D. Rogers in "Gas Interchangeability and Its Effects On U.S. Import Plans", Pipeline & Gas Journal, August 2003 at pages 19-28 and "Long-term Solution Needed To Embrace Imports With Pipeline Gas", Pipeline & Gas Journal, September 2003, at pages 14-22. For example, such "GHV reduction" or "BTU stabilization" is said by Rogers to be conducted by one or more of the following methods: 1) blending of a high GHV LNG liquid with another LNG liquid having a lower GHV value, such as in the storage tank used to hold LNG prior to sendout; 2) blending of natural gas obtained from a high GHV LNG after vaporization with domestically produced natural gas having a relatively low GHV; 3) injection of an inert gas, such as air or nitrogen, into vaporized LNG prior to its introduction into a pipeline; and 4) stripping heavier hydrocarbons such as ethane, propane, and butane (also known as natural gas liquids or NGLs) from the LNG prior to sendout.

A particular method for NGL removal to lower the GHV of LNG is disclosed by U.S. Pat. No. 6,564,579.

The methods mentioned above generally require significant additional capital costs or have operational problems associated with them. For example, option 1 advanced by Rogers is not very practical as it would either require maintaining a separate inventory of LNG liquids with suitable GHV values, or very careful management of shipments of specific LNG liquids with suitable GHV values for blending with the remaining LNG contained within existing storage tanks. Option 3 would require expensive equipment to conduct the injection into the vaporized LNG, including compressors for raising the pressure up to pipeline pressure, typically as high as 100 bar. Option 4 advanced by Rogers, and the method disclosed in U.S. Pat. No. 6,564,579, would require expensive equipment to remove the desired amount of NGLs.

Conversely, in other parts of the world, such as Japan, there is a desire to increase the GHV of LNG, particularly for LNG having a relatively low GHV produced from sources of natural gas having lower levels of NGLs therein. The GHV can be increased by injection of NGLs or other combustible hydrocarbon materials, such as dimethyl ether, into the LNG such that upon vaporization the resulting natural gas product has an increased GHV.

The LNG is typically stored at low pressure, in liquid form, and at cryogenic temperatures at an import terminal. The LNG is usually pumped to a pressure that is slightly above the pressure of the natural gas distribution pipeline. The high-pressure liquid is then vaporized and sent to the distribution pipeline. The pumping operation typically involves a set of low-pressure pumps located in a storage tank or container connected in series to a set of high-pressure pumps located outside the storage tank.

In many instances in the past, LNG has been vaporized by simply burning a portion of the vaporized LNG to produce the heat to warm up and vaporize the remainder of the LNG and produce natural gas. Various heat exchange systems have been used for this purpose.

As is well known, heat input into the LNG storage tank gradually generates boil-off vapor during storage. Additional vapor generation may occur during filling of the storage container. Vapors may also be obtained from an outside source such as a ship. Ideally, the above-described boil-off vapors are included with the vaporized natural gas sendout into the distribution pipeline. Compressors may be used to boost these vapors to the high operating pressure of the pipeline, which can be as high as 100 bar. However, compressing the vapor to these high pressures requires considerable energy and expensive compressors and related equipment.

U.S. Pat. No. 6,470,706 discloses a system and related apparatus that utilizes cold LNG sendout to condense such boil-off vapors at a low interstage pressure. The teachings of U.S. Pat. No. 6,470,706 are incorporated herein by reference in their entirety. The vapor condensate combines with the liquid sendout and becomes a single phase flow into the high pressure pumps. The combined stream then flows to the vaporizers from the high-pressure pumps. Compressing the boil-off vapor stream to the distribution pipeline pressures requires considerably more energy than boosting the boil-off vapor condensate to the high pressure with a liquid pump.

Other LNG import terminals use systems similar to U.S. Pat. No. 6,470,706 that condense boil-off vapor at low pressure and pump the resulting condensate with the liquid LNG stream flowing to the vaporizer.

It would be desirable to develop a method and system for GHV reduction or BTU stabilization which is more efficient at adjusting the GHV of LNG so that upon vaporization, the resulting natural gas product is interchangeable with domestically produced natural gas or otherwise able to meet set commercial and/or pipeline specifications. It would also be desirable to develop methods and systems that may accomplish the foregoing objectives by relatively simple and low cost modifications to existing systems for vaporization of LNG.

SUMMARY OF THE INVENTION

In one aspect, the invention is directed to a method for adjusting the GHV of a liquefied natural gas comprising mixing a condensable gas with the liquefied natural gas, the amount of the liquefied natural gas being sufficient to condense at least a portion of the condensable gas and thereby produce a blended condensate.

In embodiments, the invention also is directed to a method for adjusting the GHV of a liquefied natural gas that comprises the following steps:

providing a condenser vessel having a contact area therein;

directing a condensable gas into the condenser vessel;

directing a portion of the liquefied natural gas to the condenser vessel in an amount sufficient to condense at least a portion of the condensable gas upon contact and mixing therewith; and contacting the portion of the liquefied natural gas and the condensable gas in the contact area of the condenser vessel to condense the condensable gas into the liquefied natural gas and thereby obtain a blended condensate.

In another aspect, the invention is directed a method for vaporizing a liquefied natural gas having an initial GHV to obtain a natural gas product having a final GHV compatible with pipeline or commercial requirements. The method comprises the steps of:

providing a condenser vessel having a contact area therein;

directing a condensable gas into the condenser vessel;

directing a portion of the liquefied natural gas to the condenser vessel in an amount sufficient to condense at least a portion of the condensable gas upon contact and mixing therewith;

contacting the portion of the liquefied natural gas and the condensable gas in the contact area of the condenser vessel to condense the condensable gas into the liquefied natural gas and thereby obtain a blended condensate; and vaporizing the blended condensate to produce the natural gas product.

In embodiments, the invention relates to a method for vaporizing a liquefied natural gas having an initial GHV to obtain a natural gas product having a final GHV that meets commercial specifications or is otherwise suitable for transport in a pipeline. The method comprises:

providing a condenser vessel having a contact area therein;

mixing a condensable gas with an initial portion of the liquefied natural gas to cool the condensable gas;

directing the cooled condensable gas into the condenser vessel;

directing a vapor stream to the condenser vessel, the vapor stream obtained by boil off of the liquefied natural gas from a storage tank designed to store the liquefied natural gas prior to vaporization and delivery into a pipeline;

directing a second portion of the liquefied natural gas to the condenser vessel in an amount sufficient to condense at least a portion of the condensable gas and the vapor stream upon contact and mixing with the second portion of the liquefied natural gas and thereby obtain a blended condensate;

mixing a third portion of the liquefied natural gas with the blended condensate to obtain a liquefied natural gas mixture;

increasing the pressure of the liquefied natural gas mixture to a desired pressure; and vaporizing the liquefied natural gas mixture to produce the natural gas product.

In other embodiments, the invention is more particularly directed to a method for vaporizing a liquefied natural gas having an initial GHV to obtain a natural gas product having a final GHV within a commercial specification or suitable for transport in a pipeline. The method comprises:

providing a condenser vessel having a contact area therein;

mixing nitrogen gas with an initial portion of the liquefied natural gas to cool the nitrogen gas;

directing the cooled nitrogen gas into the condenser vessel;

directing a vapor stream to the condenser vessel, the vapor stream obtained by boil off of the liquefied natural gas from a storage tank designed to store the liquefied natural gas prior to vaporization and delivery into a pipeline;

directing a second portion of the liquefied natural gas to the condenser vessel in an amount sufficient to condense at least a portion of the nitrogen gas and the vapor stream upon contact and mixing therewith to obtain a blended condensate; and vaporizing the blended condensate to produce the natural gas product.

In further embodiments, the invention is directed to a method for vaporizing a liquefied natural gas having an initial GHV to obtain a natural gas product having a final GHV within a commercial specification or suitable for transport in a pipeline, the method comprising:

providing a condenser vessel having a contact area therein;

providing an air separation plant to obtain nitrogen gas by separation of air;

mixing the nitrogen gas with an initial portion of the liquefied natural gas to cool the nitrogen gas;

directing the cooled nitrogen gas into the condenser vessel;

directing a vapor stream to the condenser vessel, the vapor stream obtained by boil off of the liquefied natural gas from a storage tank designed to store the liquefied natural gas prior to vaporization and delivery into a pipeline;

directing a second portion of the liquefied natural gas to the condenser vessel in an amount sufficient to condense at least a portion of the nitrogen gas and the vapor stream upon contact and mixing therewith to obtain a blended condensate;

mixing a third portion of the liquefied natural gas with the blended condensate to obtain a liquefied natural gas mixture;

increasing the pressure of the liquefied natural gas mixture to a desired pressure;

vaporizing the liquefied natural gas mixture to produce the natural gas product in a vaporizer which employs a heat transfer fluid to vaporize the liquefied natural gas mixture; and directing the heat transfer fluid into the air separation plant for purposes of heat exchange with one or more process streams of the air separation plant.

In another aspect, the invention relates to a system for adjusting the GHV of a liquefied natural gas. The system comprises a condenser vessel that comprises an inlet for a stream of the liquefied natural gas, an inlet for a stream of a condensable gas, an inlet for a stream of a boil-off vapor obtained by vaporization of the liquefied natural gas, an internal structural member providing a surface area for contact of the stream of the liquefied natural gas with the streams of the condensable gas and the boil-off vapor such that the condensable gas and boil-off vapor condense on contact and mixing with the liquefied natural gas stream to form a blended condensate product, and an outlet for the blended condensate product.

In other embodiments, the invention relates to a system for adjusting the GHV of a liquefied natural gas. The system comprises:

a mixing device having an inlet for a first stream of the liquefied natural gas, an inlet for a condensable gas, and an outlet, the mixing device adapted to blend the condensable gas with the first stream of a liquefied natural gas to produce a cooled blended stream;

a condenser vessel comprising an inlet for a second stream of the liquefied natural gas, an inlet for the blended stream, an internal structural member providing a surface area for contact of the liquefied natural gas with the blended stream such that the blended stream condenses on contact and mixing with the second liquefied natural gas stream to form a condensate product, and an outlet for the condensate product; and a conduit for conveying the blended stream from the outlet of the mixing device to the inlet of the condenser vessel for the blended stream.

In further embodiments, the invention is directed to a system for vaporizing a liquefied natural gas comprising:

a mixing device having an inlet for a first stream of the liquefied natural gas, an inlet for a condensable gas, and an outlet, the mixing device adapted to blend the condensable gas with the first stream of a liquefied natural gas to produce a cooled blended stream;

a condenser vessel comprising an inlet for a second stream of the liquefied natural gas, an inlet for the blended stream, an internal structural member providing a surface area for contact of the liquefied natural gas with the blended stream such that the blended stream condenses on contact and mixing with the second liquefied natural gas stream to form a blended condensate product, and an outlet for the blended condensate product;

a conduit for conveying the blended stream from the outlet of the mixing device to the inlet of the condenser vessel for the blended stream;

a pump having an inlet in fluid communication with the outlet of the condenser vessel, and an outlet; and at least one vaporizer for vaporization of the blended condensate product into a natural gas product, the at least one vaporizer having an inlet for the blended condensate product in fluid communication with the outlet of the pump; an inlet for a heat transfer fluid; an outlet for the heat transfer fluid; and an outlet for the natural gas product which is in fluid communication with an inlet of a natural gas transportation pipeline.

An important feature of the invention is that condensable gases, such as air, nitrogen, and even NGLs and other combustible hydrocarbons, such as dimethyl ether (depending upon the desired change in GHV or other natural gas specification), can be condensed into LNG by using cold LNG sendout as a condensing fluid. The type and amount of condensable gas employed is selected such that the resulting combined condensate will have a GHV value or other natural gas specification compatible with the pipeline or commercial use contemplated for the natural gas product upon vaporization of the combined condensate.

Other features and advantages are inherent in the methods and systems disclosed herein, or will become apparent to those skilled in the art from reading the following detailed description and its accompanying drawings.

BRIEF DESCRIPTION OF THE DRAWINGS

FIG. 2 further includes integration of the air separation plant with the method of FIG. 1 in that a cool heat transfer fluid, such as a mixture of water/ethylene glycol (WEG) obtained by vaporizing the LNG product by the process of FIG. 1, is used to cool various streams of the air separation plant, such as an air feed stream or nitrogen gas stream generated by the air separation plant.

DETAILED DESCRIPTION OF THE INVENTION

In the description of the Figures, the same numbers will be used to refer to the same or similar components. Further, not all heat exchangers, pumps, valves, and the like, necessary to achieve the accomplishment of the process, as known to those skilled in the art, have been shown for simplicity.

Figure 1:
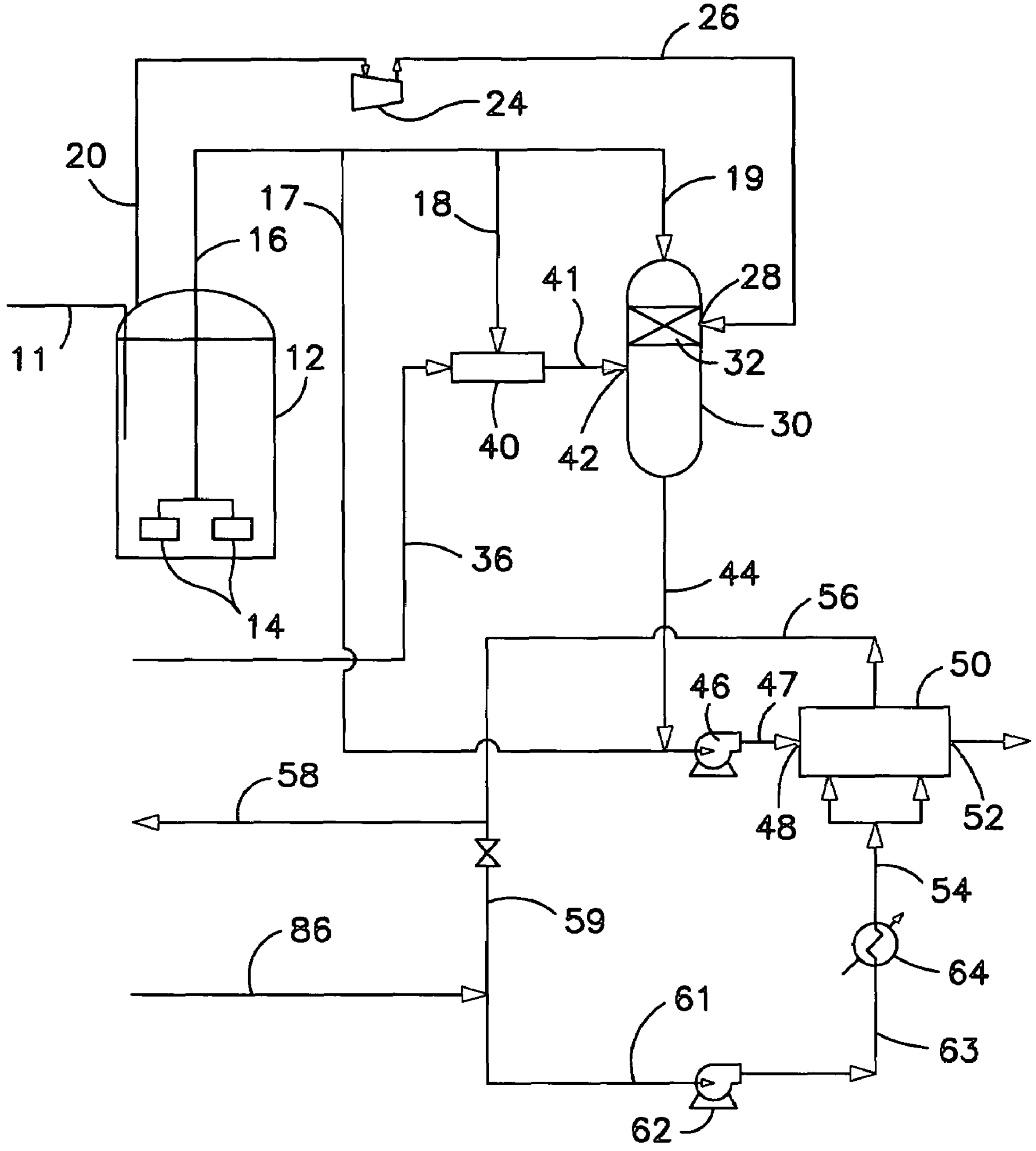
FIG. 1 is a schematic diagram for an embodiment of the invention that includes condensation of a condensable gas stream, such as a nitrogen diluent gas, by contact with a cryogenic LNG stream to produce a LNG product with an adjusted GHV relative to the cryogenic LNG stream.

Referring now to FIG. 1, an embodiment of a system for vaporizing LNG in accordance with the present invention is shown. Typically, processes for vaporizing LNG are based upon a system wherein LNG is delivered, for instance, by an ocean going tanker via line 11 into LNG storage tank 12. Tank 12 is a cryogenic tank as known to those skilled in the art for storage of LNG. The LNG could alternatively be supplied by a process located adjacent to tank 12, by pipeline, or any other source.

As mentioned above, such LNG generally has a GHV which is higher than domestically produced natural gas present in pipelines or otherwise used commercially; typically the LNG imported from most natural gas producing areas has a GHV of greater than 1065 BTU/ft$^3$, and generally from 1070 BTU/ft$^3$ to 1200 BTU/ft$^3$, and more specifically from 1080 BTU/ft$^3$ to 1150 BTU/ft$^3$.

As shown, in-tank, low-pressure pumps 14 are used to pump the LNG from tank 12 through a line 16, which LNG is typically stored at a temperature of about −255° F. (−159.4° C.) to about −265° F. (−165° C.) and a pressure of about 2 to 5 psig (0.138 to 0.345 bar). Pump 14 typically pumps the LNG through line 16 at a pressure from 35 psig (2.4 bar) to 200 psig (13.8 bar), preferably from about 50 psig (3.4 bar) to about 150 psig (10.4 bar), and at substantially the temperature at which the LNG is stored in tank 12.

The LNG as delivered inevitably is subject to some gas vapor loss (collectively boil-off vapor as mentioned previously) and is conveyed from tank 12 as shown through a line 20. This boil-off vapor directed via line 20 is typically recompressed in a compressor 24 driven by a power source, not shown. The power source may be a gas turbine, a gas engine, an engine, a steam turbine, an electric motor or the like. As shown, the compressed boil-off vapor is passed through a line 26 to a condenser vessel 30 where it enters the vessel at inlet 28. The boil-off vapor is condensed, as shown, by passing a quantity of cold LNG from tank 12 via line 16 and a line 19 into a condenser vessel 30 where the boil-off vapor, which is now at an increased pressure, is contacted in a contact area 32 of condenser vessel 30 with the cold LNG from line 19. Upon contact and mixing with the cold LNG stream, the boil-off vapor condenses and is combined with the LNG stream to desirably produce a substantially liquid LNG stream that may be recovered through a line 44. A line 17 is used to direct a portion of the cold LNG from line 16 directly to high-pressure pump 46 (described hereinbelow) and thereby bypass the condenser vessel 30. The amount of cold LNG conveyed by line 17 will depend on the amount of natural gas product to be produced in vaporizer 50 (as needed by local market demand) and also the amount of cold LNG conveyed by lines 18 and 19 as necessary to condense the boil-off gas and condensable gas in condenser vessel 30.

To adjust the GHV of the LNG, a source of a condensable gas (which may have no GHV or a different GHV) is provided via line 36, which for reduction of GHV is desirably air or nitrogen (molecular nitrogen or $N_2$) gas. Preferably, the condensable gas is nitrogen gas, as this gas is generally inert and does not contribute toward corrosion of the contact vessel 30 or any related downstream equipment. In the event that an increase in GHV is desired, the condensable gas may be a stream with a higher GHV value relative to the LNG employed, such as a relatively NGL rich hydrocarbon stream with a higher carbon content of $C_{2+}$, such as ethane, propane, and butane, or other combustible hydrocarbon such as dimethyl ether. The amount of condensable gas employed will depend on the specific LNG and condensable gas employed, and also the desired GHV value as a result of condensing the condensable gas into the LNG. In preferred embodiments of those embodiments which employ nitrogen gas as a condensable gas, the nitrogen is employed in an amount such that the total content of inerts (nitrogen and carbon dioxide) is about 4 mol % or less due to pipeline specifications. The condensable gas is supplied at a pressure generally slightly above the operating pressure of the condenser vessel 30.

The nitrogen gas employed can be from any source known in the art, including but not limited to, that obtained by separation of nitrogen from air according to well-known technology. Alternatively, the nitrogen can be generated and separated from air using one or more membrane separator cells, also according to well-known, commercially available technology. If nitrogen gas is not generated on or adjacent to the site where the instant method is being practiced, the nitrogen gas may be supplied from an external source and stored in containers, such as one or more storage tanks, until used according to the present method.

In the embodiment shown in FIG. 1, the condensable gas is first directed to a mixing device 40 which generally mixes the condensable gas with a stream of cold LNG provided to mixing device 40 via a line 18. The mixing device 40 is provided to mix the condensable gas with a cold stream of LNG so as to desuperheat the condensable gas and enhance the condensation of such condensable gas in condenser vessel 30. Preferably, the mixing device 40 is a static, in-line mixer, which is well known to those skilled in the art and available from a variety of vendors. The mixing device 40 also minimizes the condensing load on the contact area 32 of mixing device 30. Treatment of the condensing gas in mixing device 40 also helps reduce the required size of the condenser vessel 30. After conditioning of the condensable gas in mixing device 40, the condensing gas is at a pressure of from 35 psig (2.4 bar) to 200 psig (13.8 bar), preferably at a pressure of from 50 (3.4 bar) to 150 psig (10.3 bar), and a temperature of from −260° F. (−165° C.) to −150° F. (−162.2° C.). However, it may be possible to omit mixing device 40, if the condensing gas is supplied at a sufficiently low temperature and a flow rate which minimizes, and preferably substantially eliminates, the presence of vapor or condensing gas at the inlet of high-pressure pump 46.

Condenser vessel 30 may be any vessel known in the art for condensing boil-off vapor from LNG storage tanks and vessels, as mentioned in U.S. Pat. Nos. 6,470,706 B1 and 6,564,579 B1, the teachings of which are hereby incorporated by reference in their entirety. In particular, the condenser vessel and related apparatus described in U.S. Pat. No. 6,470,706 are preferred for use in the practice of the present invention. The condenser vessel 30 generally has internal members, such as a plurality of packing elements, such as 2-inch (5.1 cm) Pall rings, disposed within the vessel to provide a contact area 32 which has an enhanced surface area for contact of LNG with both boil-off gas and the condensing gas. The heat and mass transfer for vapor/gas condensing in the contact area 32 can also be enhanced by any of the various alternative means well known in the art for gas/liquid contact in a column, such as by structured packing, tray columns and spray elements. After conditioning of the condensing gas in mixing device 40, the condensing gas is conveyed by a line 41 to the condenser vessel 30, wherein it is introduced via inlet 42. Preferably, the inlet 42 is at or below the contact area 32. Upon contact and mixing with the cold LNG introduced into the condenser vessel, the condensing gas also condenses with the boil-off vapor and forms a blended condensate which is then conveyed by a line 44 to high-pressure pump 46.

It is possible in some embodiments to omit condenser vessel 30 such that the condensable gas is mixed with a stream of cold LNG, and thereby condensed upon contact and mixing therewith, within mixing device 40, and preferably a static, in-line mixer is used for mixing device 40 as previously described. In such embodiments, the hydraulic conditions should be sufficient that the resulting mixed, condensed stream is substantially in the liquid phase and of sufficient volume, i.e. surge, prior to being introduced to high-pressure pump 46 described hereinafter so that two-phase flow into said pump is avoided or minimized.

The condenser vessel 30 is typically operated at a pressure of from 35 psig (2.4 bar) to 200 psig (13.8 bar), and preferably 50 psig (3.4 bar) to 150 psig (10.3 bar), and a temperature of from −265° F. (−165° C.) to −200° F. (−128.9° C.), and preferably from −265° F. (−165° C.) to −260° F. (−162.2° C.).

High-pressure pump 46 receives cold LNG via line 17 and the blended condensate via line 44 and thereby increases the pressure thereof; typically, high pressure pump 46 discharges the resulting LNG mixture into a line 47 at a pressure suitable for delivery to a pipeline. Such pipeline pressures are typically from about 800 psig (55.2 bar) to about 1200 psig (82.7 bar) and can be up to 1450 psig (100 bar), although these specifications may vary from one pipeline to another. The LNG mixture in line 47 is passed to the inlet 48 of a vaporizer 50 or other heat exchanger well known in the art for vaporization of LNG. A natural gas product exits the vaporizer 50 at outlet 52 suitable for introduction into an existing natural gas transmission pipeline or system or other commercial use. Typically the temperature of the natural gas exiting from outlet 52 is about 30° F. (1° C.) to 50° F. (10° C.), but this may also vary.

In terms of GHV, the LNG mixture in line 47 will in some embodiments result in a natural gas product upon vaporization of 1065 BTU/ft$^3$ or less, and for those embodiments it is preferably from 1020 BTU/ft$^3$ to 1065 BTU/ft$^3$.

Figure 2:
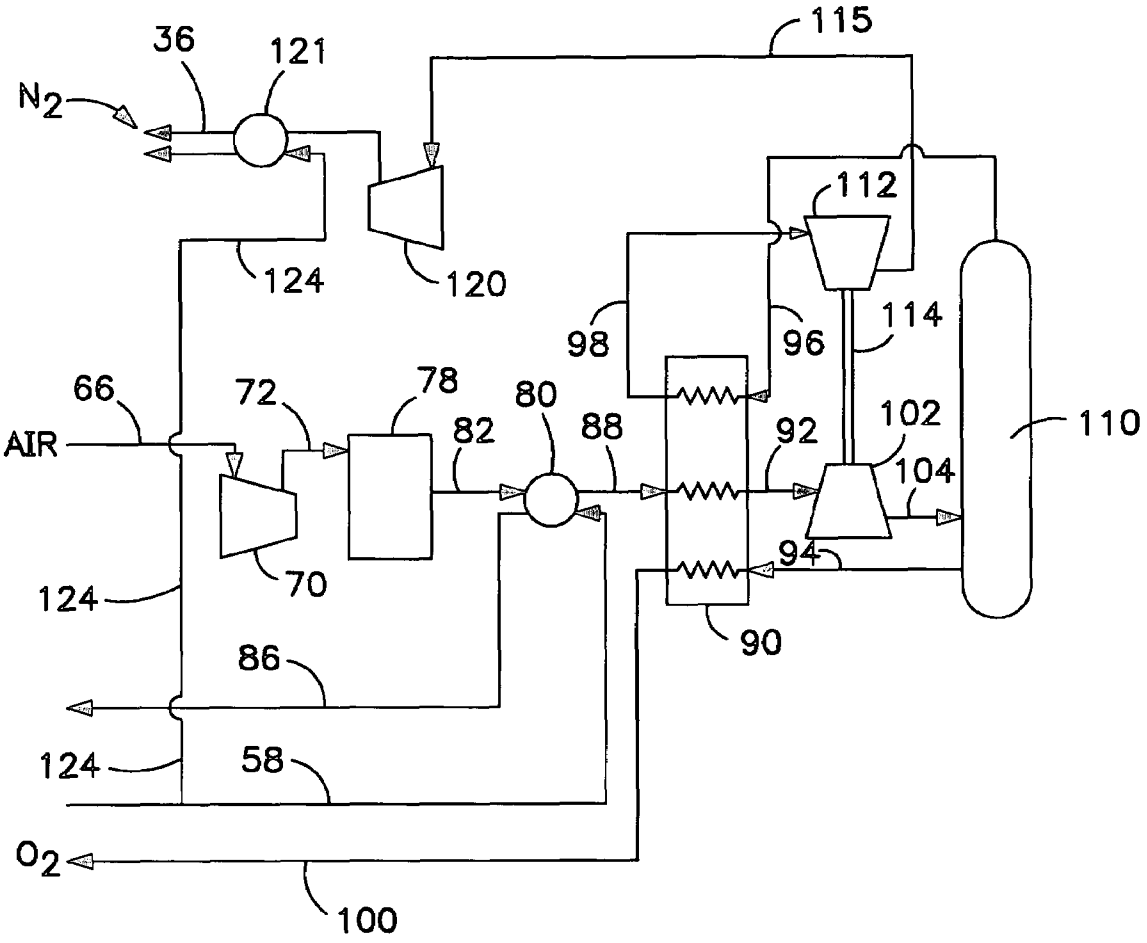
FIG. 2 is a schematic diagram of another embodiment of the invention that includes an air separation plant for generation of a nitrogen gas stream that may be employed as a condensable gas in the process depicted in FIG. 1.

Vaporizer 50 may be any type known in the art for vaporizing a LNG stream, such as a shell and tube heat exchanger, submerged combustion vaporizer, or open rack vaporizer. For example, water or air may be used as a heat exchange media, or the heat exchanger may be a fired unit. Such variations are well known to those skilled in the art. It is preferred in practicing the invention to use water, or a mixture of water and other heat exchange fluid, such as ethylene glycol, as the heat exchange medium in vaporizer 50. In FIG. 1, a cooling loop is shown. A cool stream of heat transfer medium, such as a 50/50 mixture by weight of water and ethylene glycol, exits vaporizer 50 through line 56. A line 58 is shown wherein a portion of the cool heat transfer medium is conveyed by line 58 outside of the system for use elsewhere, such as for example, use as a coolant to condition the air feed or other process stream associated with a nitrogen/oxygen air separation plant as shown in FIG. 2 and discussed hereinbelow. The cool heat transfer medium could also be used to cool the condensing gas, such as nitrogen, which is obtained from the separation plant or elsewhere, and used in the process as described herein. Pump 62 is used to convey the heat transfer medium through lines 59, 61, 63 and 54 into vaporizer 50. A heat exchanger 64 can be used to adjust the temperature of the heat transfer medium to a desired temperature for use in vaporizer 50.

Referring now to FIG. 2, an embodiment of the invention is shown which includes an integrated air separation plant for purposes of supplying nitrogen gas as a condensable gas for use in the condenser vessel 30 of FIG. 1. Air is fed to the air separation plant via a line 66 which is initially directed to a compressor 70, wherein the pressure is increased to that typical for use in an air separation plant, such as from 250 psig (17.2 bar) to 400 psig (27.6 bar), which compressor 70 is driven by a power source, not shown. The power source may be a gas turbine, a gas engine, an engine, a steam turbine, an electric motor or the like. After compression, the air feed stream is directed via line 72 to a conditioning unit 78 wherein the air is filtered to remove any particulate matter therefrom and also dehydrated by use of molecular sieve dehydration, membrane, or pressure swing adsorption (PSA), all of which are well-known in the art. The air feed is then directed to heat exchanger 80 via a line 82, wherein the air is pre-cooled to a temperature of preferably from 55° F. (12.8° C.) to 100° F. (37.8° C.) before cryogenic distillation. As another integration feature, heat exchanger 80 utilizes a heat transfer medium (coolant) conveyed by line 58 that comprises the portion of the cool heat transfer medium as previously described, which is obtained from the cooling loop employed for vaporization of the LNG in vaporizer 50 of FIG. 1. Line 86 returns the heat transfer medium to line 59 of the cooling loop that employs the heat transfer medium as shown in FIG. 1. Utilization of this cool heat transfer medium can result in significant savings in terms of operating costs. Further, use of the heat transfer medium to indirectly transfer heat from the air feed stream to the cold LNG being vaporized allows beneficial use of the cold LNG without the safety (explosive combustion) concerns that might be present if the cold LNG stream is used in a heat exchanger to directly transfer heat from the air feed stream to the LNG and/or the relatively rich, but cold, $O_2$ stream resulting from the air separation.

After pre-cooling, the air feed is conveyed by a line 88 to heat exchanger 90 wherein the air is further cooled to a temperature of from −100° F. (−73.3° C.) to −250° F. (−156.7° C.) by heat exchange with cold process streams provided by lines 96 and 94 as described hereinafter. Heat exchanger 90 is typically a multi-pass, plate-fin heat exchanger of the type well-known to those skilled in the art. The cooled air stream is then conveyed by line 92 to turboexpander 102, where the cooled air stream is expanded in the turboexpander 102 to provide a cooled air stream at a temperature of from −260° F. (−162.2° C.) to −300° F. (−184.4° C.) which is conveyed via line 104 to distillation column 110.

In distillation column 110, the condensed air stream is separated into streams of relatively pure nitrogen and oxygen, which are recovered from distillation column 110 by lines 96 and 94 respectively. A reboiler is used in conducting the distillation as known to those skilled in the art, and is not shown for simplicity. Distillation column 110 employs well-known air separation technology for separation of the air into the respective streams of nitrogen and oxygen. The stream of nitrogen is conveyed by line 96 to heat exchanger 90, wherein it is used in exchange relationship to cool the air feed introduced into heat exchanger 90 by line 88. The nitrogen stream is then conveyed by line 98 to a compressor 112, that is driven by work derived from expansion of air in turboexpander 102 that is transferred to compressor 112 via shaft 114. After initial compression in compressor 112, the nitrogen stream is then conveyed by line 115 to compressor 120, wherein it is further compressed to a pressure of from 50 psig (3.4 bar) to 150 psig (10.3 bar) suitable for being used in condenser vessel 30 of FIG. 1. The compressed nitrogen gas stream is then cooled in a heat exchanger 121 using a portion of the cooled heat exchange medium (water, ethylene glycol, or mixture thereof) taken from line 58, which portion is conveyed to heat exchanger 121 via line 124. The compressed nitrogen gas stream is then conveyed to the condenser vessel 30 by line 36. Similarly, the stream of oxygen is conveyed by line 94 to heat exchanger 90, wherein it is also used in heat exchange relationship to cool the air feed introduced into heat exchanger 90. The oxygen is thereafter removed from the process by line 100 and used for other purposes.

Having thus described the invention by reference to certain of its preferred embodiments, it should be understood that the embodiments described herein are illustrative rather than limiting in nature and that many variations and modifications are possible within the scope of the present invention.

What is claimed is:

1. A method for adjusting the GHV of a liquefied natural gas comprising:

- providing a condenser vessel having a contact area therein;
- directing a condensable gas into the condenser vessel;
- directing a portion of the liquefied natural gas to the condenser vessel in an amount sufficient to condense at least a portion of the condensable gas upon contact and mixing therewith under cryogenic conditions; and
- contacting the portion of the liquefied natural gas and the condensable gas in the contact area of the condenser vessel under cryogenic conditions to condense the condensable gas into the liquefied natural gas and thereby obtain a blended condensate.

2. The method of claim 1 wherein the liquefied natural gas initially has a GHV upon vaporization of greater than 1065 BTU/ft$^3$.

3. The method of claim 1 wherein the liquefied natural gas initially has a GHV upon vaporization of from 1070 BTU/ft$^3$ to 1200 BTU/ft$^3$.

4. The method of claim 1 wherein the liquefied natural gas initially has a GHV upon vaporization of from 1080 BTU/ft$^3$ to 1150 BTU/ft$^3$.

5. The method of claim 1 wherein the condensable gas is a nitrogen-containing gas.

6. The method of claim 5 wherein the condensable gas is air.

7. The method of claim 5 wherein the condensable gas is nitrogen gas.

8. The method of claim 1 further comprising mixing the condensable gas with an initial portion of the liquefied natural gas to reduce the temperature of the condensable gas prior to its being introduced into the condenser vessel.

9. The method of claim 1 wherein the condenser vessel is maintained at a temperature of from −265° F. (−165° C.) to −200° F. (−128.9° C.).

10. The method of claim 1 wherein the condenser vessel is maintained at a pressure of from 35 psig (2.4 bar) to 200 psig (13.8 bar).

11. The method of claim 7 further comprising providing the nitrogen gas by separating nitrogen from air.

12. The method of claim 5 further comprising providing the nitrogen-containing gas by separating out at least a portion of the oxygen in air by use of one or more oxygen-permeable membrane separator cells.

13. The method of claim 1 further comprising directing a vapor stream to the condenser vessel, the vapor stream obtained by boil off of the liquefied natural gas from a storage tank designed to store the liquefied natural gas prior to vaporization and delivery into a pipeline system; and contacting the vapor stream with the portion of the liquefied natural gas and the condensable gas in the contact area of the condenser vessel such that the vapor stream condenses in the condenser vessel and is included within the blended condensate.

14. The method of claim 1 wherein the condensable gas comprises ethane, propane, butane, dimethyl ether, or mixtures thereof.

15. The method of claim 1 wherein the blended condensate is mixed with a second portion of the liquefied natural gas to produce a liquefied natural gas mixture.

16. The method of claim 15 wherein the natural gas mixture has a GHV upon vaporization of 1065 BTU/ft$^3$ or less.

17. The method of claim 15 wherein the natural gas mixture has a GHV upon vaporization of from 1020 BTU/ft$^3$ to 1065 BTU/ft$^3$.

18. The method of claim 15 further comprising:

increasing the pressure of the liquefied natural gas mixture to produce a pressurized liquefied natural gas mixture; and vaporizing the pressurized liquefied natural gas mixture to produce a natural gas product.

19. A method for vaporizing a liquefied natural gas having an initial GHV to obtain a natural gas product having a final GHV compatible with pipeline or commercial requirements, the method comprising:

providing a condenser vessel having a contact area therein;

directing a condensable gas into the condenser vessel;

directing a portion of the liquefied natural gas into the condenser vessel in an amount sufficient to condense at least a portion of the condensable gas upon contact and mixing therewith under cryogenic conditions;

contacting the portion of the liquefied natural gas and the condensable gas in the contact area of the condenser vessel under cryogenic conditions to condense the condensable gas into the liquefied natural gas and thereby obtain a blended condensate; and vaporizing the blended condensate to produce the natural gas product.

20. The method of claim 19 wherein the liquefied natural gas initially has a GHV upon vaporization of greater than 1065 BTU/ft$^3$.

21. The method of claim 19 wherein the liquefied natural gas initially has a GHV upon vaporization of from 1070 BTU/ft$^3$ to 1200 BTU/ft$^3$.

22. The method of claim 19 wherein the liquefied natural gas initially has a GHV upon vaporization of from 1080 BTU/ft$^3$ to 1150 BTU/ft$^3$.

23. The method of claim 19 wherein the condensable gas is a nitrogen-containing gas.

24. The method of claim 23 wherein the condensable gas is air.

25. The method of claim 23 wherein the condensable gas is nitrogen.

26. The method of claim 19 further comprising mixing the condensable gas with an initial portion of the liquefied natural gas to reduce the temperature of the condensable gas prior to its being introduced into the condenser vessel.

27. The method of claim 19 wherein the condenser vessel is maintained at a temperature of from −265° F. (−165° C.) to −200° F. (−128.9° C.).

28. The method of claim 19 wherein the condenser vessel is maintained at a pressure of from 35 psig (2.4 bar) to 200 psig (13.8 bar).

29. The method of claim 25 further comprising providing the nitrogen gas by separating nitrogen from air.

30. The method of claim 23 further comprising providing the nitrogen-containing gas by separating out at least a portion of the oxygen in air by use of one or more oxygen-permeable membrane separator cells.

31. The method of claim 19 further comprising directing a vapor stream to the condenser vessel, the vapor stream obtained by boil off of the liquefied natural gas from a storage tank designed to store the liquefied natural gas prior to vaporization and delivery into a pipeline system; and contacting the vapor stream with the portion of the liquefied natural gas and the condensable gas in the condenser vessel such that the vapor stream condenses in the condenser vessel and is included within the blended condensate.

32. The method of claim 19 wherein the condensable gas comprises ethane, propane, butane, or mixtures thereof.

33. The method of claim 19 wherein the blended condensate is mixed with a second portion of the liquefied natural gas to produce a liquefied natural gas mixture.

34. The method of claim 33 wherein the liquefied natural gas mixture has a GHV upon vaporization of 1065 BTU/ft$^3$ or less.

35. The method of claim 33 wherein the liquefied natural gas mixture has a GHV upon vaporization of from 1020 BTU/ft$^3$ to 1065 BTU/ft$^3$.

36. The method of claim 33 further comprising:

increasing the pressure of the liquefied natural gas mixture to produce a pressurized liquefied natural gas mixture; and vaporizing the pressurized liquefied natural gas mixture to produce a natural gas product.

37. A system for adjusting the GHV of a liquefied natural gas comprising:

a mixing device having an inlet for a first stream of the liquefied natural gas, an inlet for a condensable gas, and an outlet, the mixing device adapted to blend the condensable gas with the first stream of the liquefied natural gas to produce a cooled blended stream;

a condenser vessel comprising an inlet for a second stream of the liquefied natural gas, an inlet for the cooled blended stream, an internal structural member providing a surface area for contact of the second liquefied natural gas stream with the blended stream such that the blended stream condenses on contact and mixing with the second liquefied natural gas stream under cryogenic conditions to form a condensate product, and an outlet for the condensate product; and a conduit for conveying the blended stream from the outlet of the mixing device to the inlet of the condenser vessel for the blended stream.

38. The system of claim 37 wherein the condenser vessel further comprises an inlet for a boil off gas vapor stream from a storage tank for the liquefied natural gas.

39. The system of claim 37 wherein the mixing device is a static, in-line mixer.

40. A system for vaporizing a liquefied natural gas comprising:

a mixing device having an inlet for a first stream of the liquefied natural gas, an inlet for a condensable gas, and an outlet, the mixing device adapted to blend the condensable gas with the first stream of the liquefied natural gas to produce a cooled blended stream;

a condenser vessel comprising an inlet for a second stream of the liquefied natural gas, an inlet for the cooled blended stream, an internal structural member providing a surface area for contact of the second liquefied natural gas stream with the blended stream such that the blended stream condenses on contact and mixing with the second liquefied natural gas stream under cryogenic conditions to form a blended condensate product, and an outlet for the blended condensate product;

a conduit for conveying the blended stream from the outlet of the mixing device to the inlet of the condenser vessel for the blended stream;

a pump having an inlet in fluid communication with the outlet of the condenser vessel, and an outlet; and at least one vaporizer for vaporization of the condensate product into a natural gas product, the at least one vaporizer having an inlet for the blended condensate product in fluid communication with the outlet of the pump; an inlet for a heat transfer fluid; an outlet for the heat transfer fluid; and an outlet for the natural gas product which is in fluid communication with an inlet of a natural gas transportation pipeline.

41. The system of claim 40 wherein the condenser vessel further comprises an inlet for a boil off gas vapor stream from a storage tank for the liquefied natural gas.

42. The system of claim 40 wherein the mixing device is a static, in-line mixer.

43. The system of claim 42 wherein the condensable gas is nitrogen gas obtained by separation of the nitrogen gas from oxygen in an air separation plant.

44. The system of claim 43 wherein the outlet for the heat transfer fluid of the at least one vaporizer is in fluid communication with a heat exchanger used to cool an air feed to the air separation plant.

45. The system of claim 43 wherein the outlet for the heat transfer fluid of the at least one vaporizer is in fluid communication with a heat exchanger used to cool the nitrogen gas obtained by separation of the nitrogen gas from oxygen in the air separation plant.

46. The system of claim 44 wherein the heat transfer fluid is water, ethylene glycol, or a mixture thereof.

47. The system of claim 45 wherein the heat transfer fluid is water, ethylene glycol, or a mixture thereof.

48. A method for vaporizing a liquefied natural gas having an initial GHV to obtain a natural gas product having a final GHV within a commercial specification or suitable for transport in a pipeline, the method comprising:

providing a condenser vessel having a contact area therein;

mixing nitrogen gas with an initial portion of the liquefied natural gas to cool the nitrogen gas;

directing the cooled nitrogen gas into the condenser vessel;

directing a vapor stream to the condenser vessel, the vapor stream obtained by boil off of the liquefied natural gas from a storage tank designed to store the liquefied natural gas prior to vaporization and delivery into a pipeline;

directing a second portion of the liquefied natural gas to the condenser vessel in an amount sufficient to condense at least a portion of the nitrogen gas and the vapor stream upon contact and mixing therewith under cryogenic conditions to obtain a blended condensate; and vaporizing the blended condensate to produce the natural gas product.

49. A method for vaporizing a liquefied natural gas having an initial GHV to obtain a natural gas product having a final GHV within a commercial specification or suitable for transport in a pipeline, the method comprising:

providing a condenser vessel having a contact area therein;

providing an air separation plant to obtain nitrogen gas by separation of air;

mixing the nitrogen gas with an initial portion of the liquefied natural gas to cool the nitrogen gas;

directing the cooled nitrogen gas into the condenser vessel;

directing a vapor stream to the condenser vessel, the vapor stream obtained by boil off of the liquefied natural gas from a storage tank designed to store the liquefied natural gas prior to vaporization and delivery into a pipeline;

directing a second portion of the liquefied natural gas to the condenser vessel in an amount sufficient to condense at least a portion of the nitrogen gas and the vapor stream upon contact and mixing therewith to obtain a blended condensate;

mixing a third portion of the liquefied natural gas with the blended condensate to obtain a liquefied natural gas mixture;

increasing the pressure of the liquefied natural gas mixture to a desired pressure;

vaporizing the liquefied natural gas mixture to produce the natural gas product in a vaporizer which employs a heat transfer fluid to vaporize the liquefied natural gas mixture; and directing the heat transfer fluid into the air separation plant for purposes of heat exchange with one or more process streams of the air separation plant.

50. The method of claim 49 wherein the heat transfer fluid is used to cool an air feed to the air separation plant.

51. The method of claim 49 wherein the heat transfer fluid is used to cool the nitrogen gas obtained from the air separation plant.

52. A method for vaporizing a liquefied natural gas having an initial GHV to obtain a natural gas product having a final GHV that meets commercial specifications or is otherwise suitable for transport in a pipeline, the method comprising:

providing a condenser vessel having a contact area therein;

mixing a condensable gas with an initial portion of the liquefied natural gas to cool the condensable gas;

directing the cooled condensable gas into the condenser vessel;

directing a vapor stream to the condenser vessel, the vapor stream obtained by boil off of the liquefied natural gas from a storage tank designed to store the liquefied natural gas prior to vaporization and delivery into a pipeline;

directing a second portion of the liquefied natural gas to the condenser vessel in an amount sufficient to condense at least a portion of the condensable gas and the vapor stream upon contact and mixing with the second portion of the liquefied natural gas and thereby obtain a blended condensate;

mixing a third portion of the liquefied natural gas with the blended condensate to obtain a liquefied natural gas mixture;

increasing the pressure of the liquefied natural gas mixture to a desired pressure; and vaporizing the liquefied natural gas mixture to produce the natural gas product.

53. A system for adjusting the GHV of a liquefied natural gas, the system comprising a condenser vessel that comprises an inlet for a stream of the liquefied natural gas, an inlet for a stream of a condensable gas, an inlet for a stream of a boil-off vapor obtained by vaporization of the liquefied natural gas, an internal structural member providing a surface area for contact of the stream of the liquefied natural gas with the streams of the condensable gas and the boil-off vapor such that the condensable gas and the boil-off vapor condense on contact and mixing under cryogenic conditions with the liquefied natural gas stream to form a blended condensate product, and an outlet for the blended condensate product.

54. A method for adjusting the GHV of a liquefied natural gas comprising mixing a condensable gas with the liquefied natural gas, the amount of the liquefied natural gas being sufficient to condense at least a portion of the condensable gas under cryogenic conditions and thereby produce a blended condensate.

55. The method of claim 54 wherein the condensable gas is a nitrogen-containing gas.

56. The method of claim 55 wherein the condensable gas is air.

57. The method of claim 55 wherein the condensable gas is nitrogen gas.

58. The method of claim 54 wherein the condensable gas comprises ethane, propane, butane, dimethyl ether, or mixtures thereof.

59. The method of claim 54 wherein the blended condensate is mixed with a second amount of the liquefied natural gas to produce a liquefied natural gas mixture.

60. The method of claim 59 further comprising:

increasing the pressure of the liquefied natural gas mixture to produce a pressurized liquefied natural gas mixture; and vaporizing the pressurized liquefied natural gas mixture to produce a natural gas product.

61. The method of claim 52 wherein the liquefied natural gas initially has a GHV upon vaporization of greater than 1065 BTU/ft$^3$.

62. The method of claim 52 wherein the liquefied natural gas initially has a GHV upon vaporization of from 1070 BTU/ft$^3$ to 1200 BTU/ft$^3$.

63. The method of claim 52 wherein the liquefied natural gas initially has a GHV upon vaporization of from 1080 BTU/ft$^3$ to 1150 BTU/ft$^3$.

64. The method of claim 52 wherein the condensable gas is a nitrogen-containing gas.

65. The method of claim 52 wherein the condensable gas is air.

66. The method of claim 52 wherein the condensable gas is nitrogen gas.

67. The method of claim 52 wherein the condenser vessel is maintained at a temperature of from −265° F. (−165° C.) to −200° F. (−128.9° C.).

68. The method of claim 52 wherein the condenser vessel is maintained at a pressure of from 35 psig (2.4 bar) to 200 psig (13.8 bar).

69. The method of claim 66 further comprising providing the nitrogen gas by separating nitrogen from air.

70. The method of claim 64 further comprising providing the nitrogen-containing gas by separating out at least a portion of the oxygen in air by use of one or more oxygen-permeable membrane separator cells.

71. The method of claim 52 wherein the liquefied natural gas mixture has a GHV upon vaporization of 1065 BTU/ft$^3$ or less.

72. The method of claim 52 wherein the natural gas mixture has a GHV upon vaporization of from 1020 BTU/ft$^3$ to 1065 BTU/ft$^3$.

73. A system for vaporizing a liquefied natural gas comprising:

a static, in-line mixing device having an inlet for a first stream of the liquefied natural gas, an inlet for a condensable gas comprised of nitrogen gas obtained by separation of the nitrogen gas from oxygen in an air separation plant, and an outlet, the mixing device adapted to blend the condensable gas with the first stream of the liquefied natural gas to produce a cooled blended stream;

a condenser vessel comprising an inlet for a second stream of the liquefied natural gas, an inlet for the cooled blended stream, an internal structural member providing a surface area for contact of the second liquefied natural gas stream with the blended stream such that the blended stream condenses on contact and mixing with the second liquefied natural gas stream to form a blended condensate product, and an outlet for the blended condensate product;

a conduit for conveying the blended stream from the outlet of the mixing device to the inlet of the condenser vessel for the blended stream;

a pump having an inlet in fluid communication with the outlet of the condenser vessel, and an outlet; and at least one vaporizer for vaporization of the condensate product into a natural gas product, the at least one vaporizer having an inlet for the blended condensate product in fluid communication with the outlet of the pump; an inlet for a heat transfer fluid; an outlet for the heat transfer fluid; and an outlet for the natural gas product which is in fluid communication with an inlet of a natural gas transportation pipeline.

74. The system of claim 73 wherein the condenser vessel further comprises an inlet for a boil off gas vapor stream from a storage tank for the liquefied natural gas.

75. The system of claim 73 wherein the mixing device is a static, in-line mixer.

76. The system of claim 73 wherein the condensable gas is nitrogen gas obtained by separation of the nitrogen gas from oxygen in an air separation plant.

77. The system of claim 76 wherein the outlet for the heat transfer fluid of the at least one vaporizer is in fluid communication with a heat exchanger used to cool an air feed to the air separation plant.

78. The system of claim 76 wherein the outlet for the heat transfer fluid of the at least one vaporizer is in fluid communication with a heat exchanger used to cool the nitrogen gas obtained by separation of the nitrogen gas from oxygen in the air separation plant.

79. The system of claim 77 wherein the heat transfer fluid is water, ethylene glycol, or a mixture thereof.

80. The system of claim 78 wherein the heat transfer fluid is water, ethylene glycol, or a mixture thereof.

* * * * *